(12) United States Patent
Jaynes

(10) Patent No.: US 8,487,833 B2
(45) Date of Patent: Jul. 16, 2013

(54) SENSOR DRIVEN AUTOMATIC DISPLAY CONFIGURATION SYSTEM AND METHOD

(75) Inventor: Christopher O. Jaynes, Denver, CO (US)

(73) Assignee: Mersive Technologies, Inc., Denver, CO (US)

( * ) Notice: Subject to any disclaimer, the term of this patent is extended or adjusted under 35 U.S.C. 154(b) by 178 days.

(21) Appl. No.: 13/184,296

(22) Filed: Jul. 15, 2011

(65) Prior Publication Data

US 2012/0013523 A1    Jan. 19, 2012

Related U.S. Application Data

(60) Provisional application No. 61/364,488, filed on Jul. 15, 2010.

(51) Int. Cl.
*G09G 5/00* (2006.01)
(52) U.S. Cl.
USPC ............................................... 345/1.3

(58) Field of Classification Search
USPC ................................................. 345/1.3, 5, 9
See application file for complete search history.

(56) References Cited

U.S. PATENT DOCUMENTS

| | | | | |
|---|---|---|---|---|
| 5,721,585 A * | 2/1998 | Keast et al. | .................... | 348/36 |
| 6,940,529 B2 * | 9/2005 | Deering | ........................ | 345/647 |
| 7,079,157 B2 * | 7/2006 | Deering | ........................ | 345/613 |
| 7,128,270 B2 * | 10/2006 | Silverbrook et al. | .... | 235/472.01 |
| 8,301,380 B2 * | 10/2012 | Nielsen et al. | .................... | 702/5 |
| 2010/0007665 A1 * | 1/2010 | Smith et al. | .................... | 345/473 |
| 2011/0007076 A1 * | 1/2011 | Nielsen et al. | ................ | 345/441 |
| 2011/0095885 A9 * | 4/2011 | Nielsen et al. | ................ | 340/540 |
| 2011/0279476 A1 * | 11/2011 | Nielsen et al. | ................ | 345/619 |

* cited by examiner

*Primary Examiner* — Fred Tzeng
(74) *Attorney, Agent, or Firm* — Lathrop & Gage LLP

(57) ABSTRACT

A system that senses the geometric layout of a multi-display system and then automatically configures a graphics adaptor to drive the proper ports to each display in the sensed layout. The present system and method eliminates the interactive configuration step described above by using a sensor (e.g., a camera) to determine the layout of the screens. The graphics adaptor is then automatically programmed with the appropriate display device configuration.

4 Claims, 5 Drawing Sheets

SENSOR DRIVEN AUTOMATIC DISPLAY CONFIGURATION SYSTEM AND METHOD

RELATED APPLICATIONS

This application claims priority to U.S. Provisional Patent Application Ser. No. 61/364,488, filed Jul. 15, 2010, which is herewith incorporated by reference.

BACKGROUND

A computer-driven display system is typically composed of one or more graphics output adaptors connected to a host computer and a set of displays that are connected to the graphics adaptor(s). The mapping between multiple display devices and the graphics adaptors is typically determined through the EDID protocol that specifies that a display is connected and various attributes of that display. However, this protocol does not (and cannot) automatically discover the mapping between graphics adaptor output port and the display configuration. This mapping is important so that displays render the appropriate portion of a contiguous display. This mapping is typically defined by a user through a interactive software interface.

Consider the case where a host computer contains a single graphics adaptor with that has two output ports, Output1 and Output2. A user may connect a cable from each output to a respective display monitor, Monitor1 and Monitor2. At connection time, EDID protocols determine the video resolution, supported clock timings, etc., for each of the displays. Assume that Monitor1 is connected to Output1 and Monitor2 is connected to Output2. If the user places Monitor2 to the left of Monitor1 for viewing, the graphical system should render the left side of the virtual display on Monitor2 while the right side of the virtual display should appear on Monitor1.

In previous systems, the initially unknown mapping from the output of the graphical adaptor to the virtual screen is typically managed by either the host PC graphics driver or the operating system, and is determined via user interaction. This mapping was typically accomplished through a two-step process. First, the graphics adaptor detects that a device is connected and determines its resolution, and then a user interacts with software to inform the graphics adaptor about the geometric layout of the display devices. This step was necessary to establish a mapping from the graphical output to the portion of the virtual screen that is rendered from that output.

Solution

The present method automates the mapping of output ports on a graphics adaptor in a host PC to an image displayed by a corresponding set of display devices. The present system automates the mapping of the display output adaptor to a virtual image through the use of a camera (or other sensor) that determines the physical configuration of the display (i.e., the relative positions of each of the display devices with respect to each other and to the sensor).

SUMMARY

The present method senses the geometric layout of a multi-display system and then automatically configures a graphics adaptor to drive the proper ports to each display in the measured layout. The present system and method eliminates the interactive configuration step described above by using a sensor (e.g., a camera) to determine the layout of the screens. The graphics adaptor is then automatically programmed with the appropriate display device configuration.

DETAILED DESCRIPTION

Figure 1:
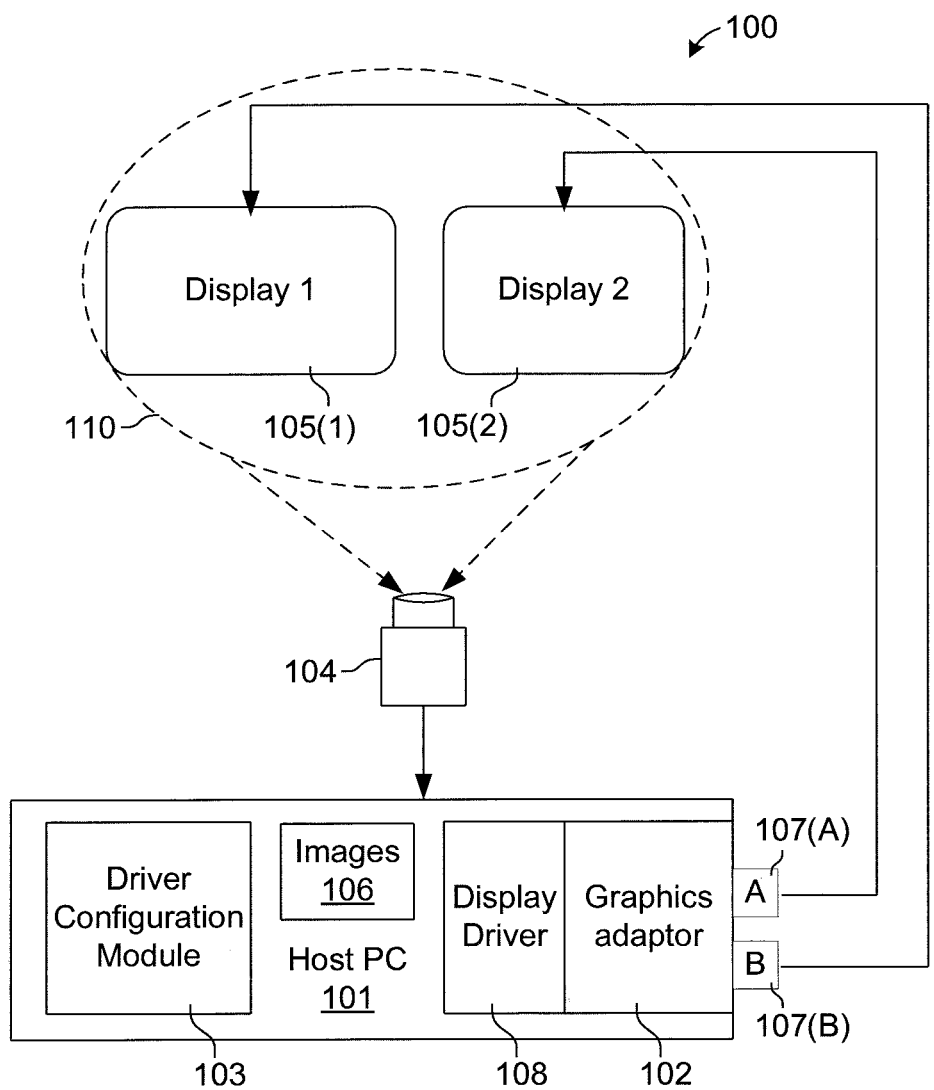
FIG. 1 is a diagram illustrating exemplary components in one embodiment of the present system.

FIG. 1 is a diagram illustrating exemplary components in one embodiment of the present system. As shown in FIG. 1, display devices 105(1) and 105(2) are driven respectively by output ports 107(B) and 107(A) of graphics adaptor 102 to produce a composite display comprising displays (or images) 'Display 1' and 'Display 2'. Host PC 101 controls graphics adaptor 102 and display driver 108 via driver configuration software module 103 running on the PC. Images to be displayed and other data are stored in local memory 106, or on separate media (not shown).

A sensor 104, such as a digital camera, is coupled to host PC 101, and captures an image 110, which is a 'full-frame' composite image that includes display devices 105(1) and 105(2). It should be noted that the present system is operable with multiple displays in different arrayed configurations (e.g., a display composed of three columns and two rows).

Driver configuration module 103 uses composite image 110 to create a display map that, in turn, is used to generate a map which determines the topological relationship of the display devices, and their relationship to output ports 107(B) and 107(A) of graphics adaptor 102, as described in detail below.

Automatic Display Configuration Process

Figure 2:
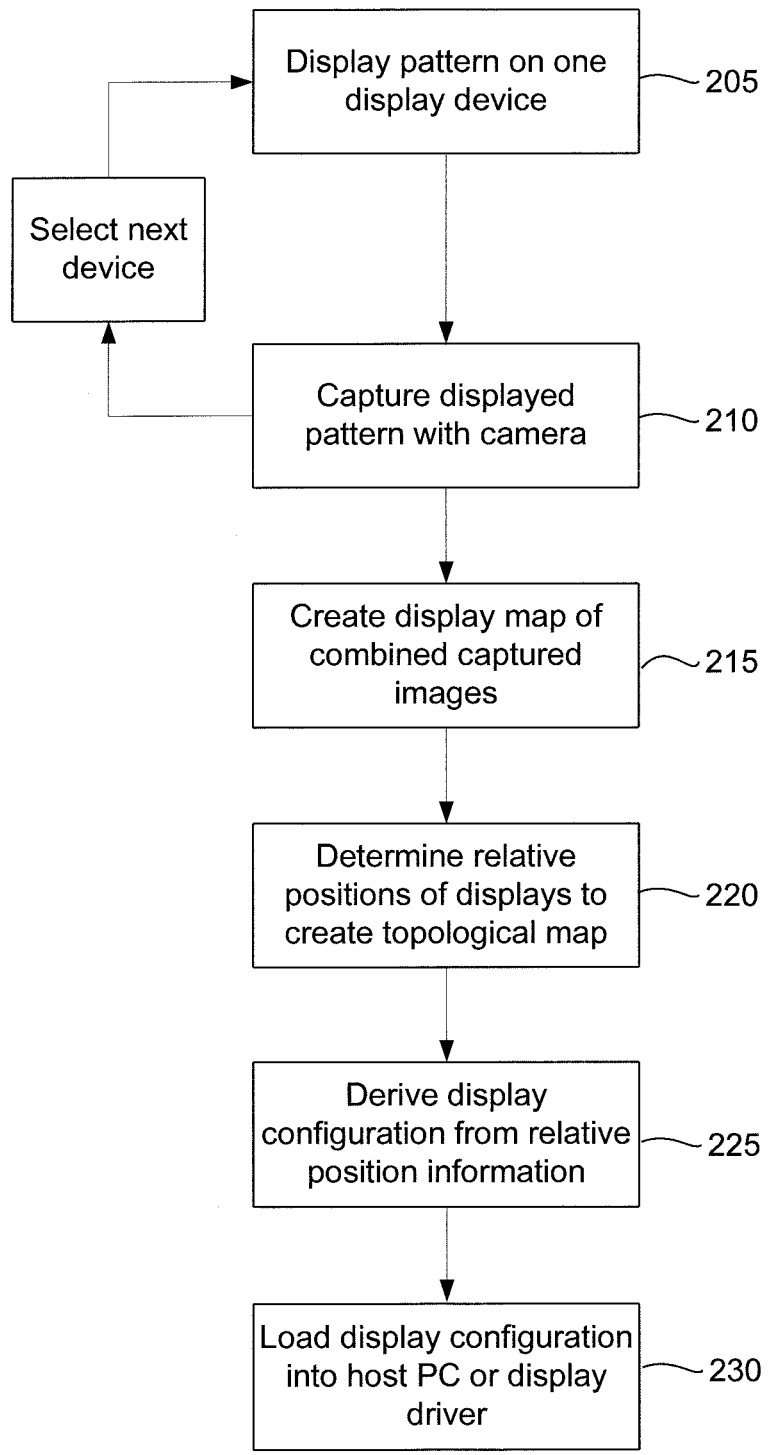
FIG. 2 is a flowchart showing an exemplary set of steps performed in the process of automatically configuring a display system.
Figure 3:
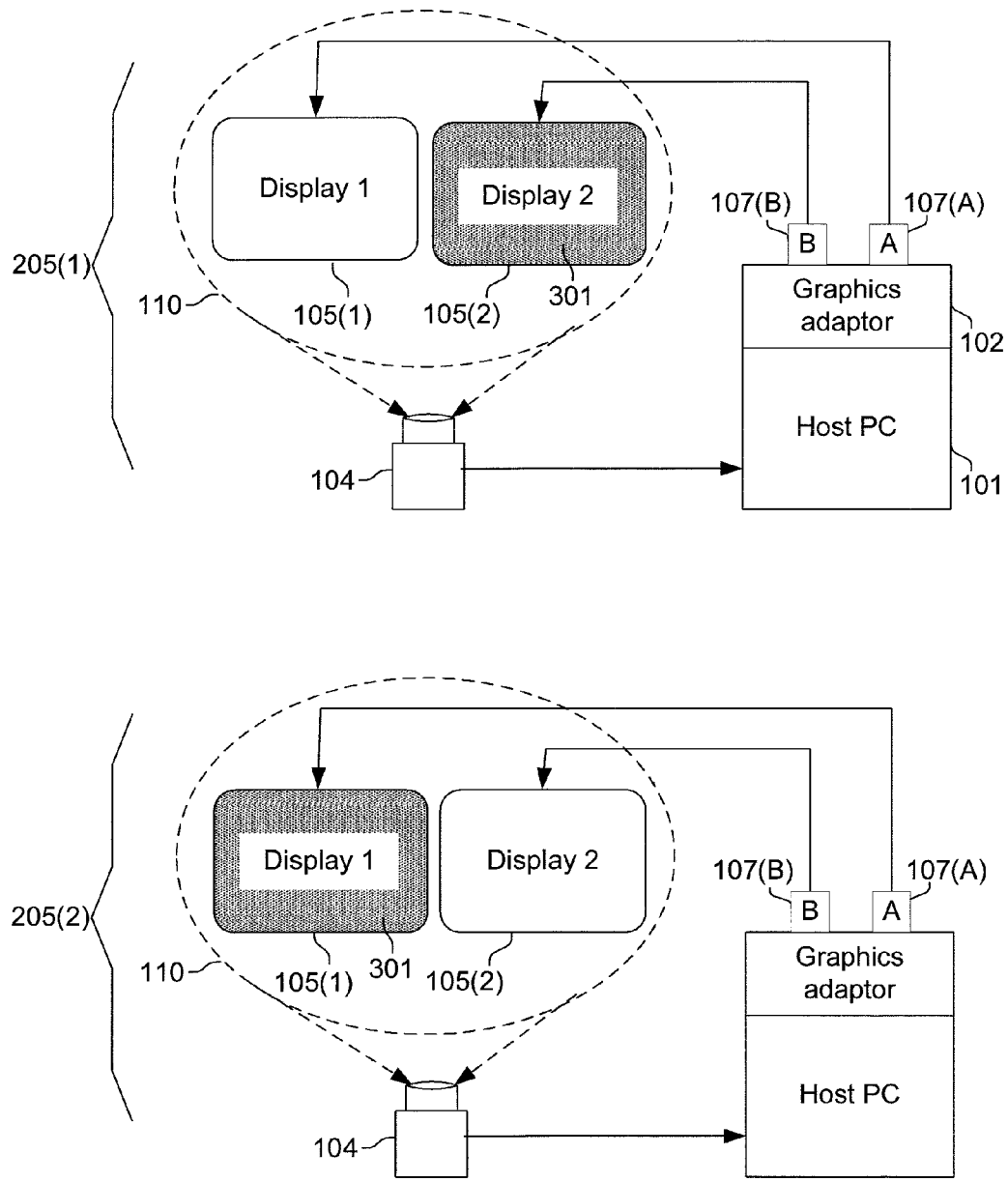
FIG. 3 is an exemplary diagram illustrating camera images of multiple displays being captured as the devices generate patterns in sequence.

FIG. 2 is a flowchart showing an exemplary set of steps performed in the process of automatically configuring a display system, and FIG. 3 is an exemplary diagram illustrating camera images of multiple displays being captured as a specific pattern is displayed sequentially on each of the display devices. As shown in FIG. 2, in step 205, and in FIG. 3, at steps 205(1) and 205(2), display driver 108 sends a unique and observable pattern 301 iteratively to each of the display devices 105, one at a time.

With a camera 104 set up so that all of the display devices are in the camera's field of view, the camera captures an image of each successive pattern 301 at step 210. Pattern 301 should be sufficiently distinguishable to allow the camera to uniquely identify what region of the camera image 110 corresponds to a particular display. In an exemplary embodiment, the pattern may be a solid white background on one display device while all other display devices are displaying black.

More specifically, during the first iteration of step 205, driver configuration module 103 sends a command to graphics adaptor port A [107(A)] which generates unique pattern 301 on display 105(1). During step 210, camera 104 then captures an image of both display 105(1) and display 105(2), as indicated by frame 205(1) in FIG. 3. At this point, display 2 is relatively dark, as it is either not being driven, or being driven with a pattern and/or color (e.g., solid black) that makes it easily distinguishable over the solid white pattern of display 1.

In the next iteration of steps 205/210, the above process is repeated using graphics adaptor port B [107(B)], which generates unique pattern 301 on display 105(2), and camera 104 again captures an image of both display 105(1) and display 105(2), as indicated by frame 205(2) in FIG. 3. The relative positioning of the patterns displayed by displays 105(1) and 105(2) allow a determination of the correspondence between graphics adaptor output ports 107(B)/107(A) and the relative location of the corresponding physical displays 105(1)/105(2).

In an alternative embodiment, different patterns are sent simultaneously to each of the display devices 105, and camera 104 captures an image of each of the patterns at a single point in time.

When each pattern 301 has been captured by the camera, the relative position of each display 105, corresponding to a specific region or position in the camera image, is recorded. This positional information is used to yield a 'display map' (step 215) that encodes the relative location of each display in the camera and shows the physical configuration of the display devices. Display mapping is described in detail below. Any type of sensor that is able to provide information regarding the relative positioning of the displays, including touch sensors mounted at the edge of the display frames, GPS, or other wireless approaches, may be used in lieu of a camera.

The display map is then processed to determine the relative position of each display at step 220, which information is then used to generate a topological map, described in detail below. This step may involve image processing and other steps that may require additional information (e.g., the orientation of the camera relative to the display devices).

The relative position of each display as established in the topological map is then used to derive a display configuration that is appropriate for that set of displays at step 225. The display configuration indicates the display configuration parameters that are needed by the graphics host subsystem in order to generate the appropriate input data to the displays, including the correspondence between graphics adaptor output ports 107(B)/107(A) and each physical display 105. At step 230, this display configuration information is used to inform the host PC operating system, or the graphics driver, of the display configuration via an interface. The interface includes either a set of API calls to the OS or graphics driver, or other appropriate methods such as writing a configuration file to the host PC.

Figure 4:
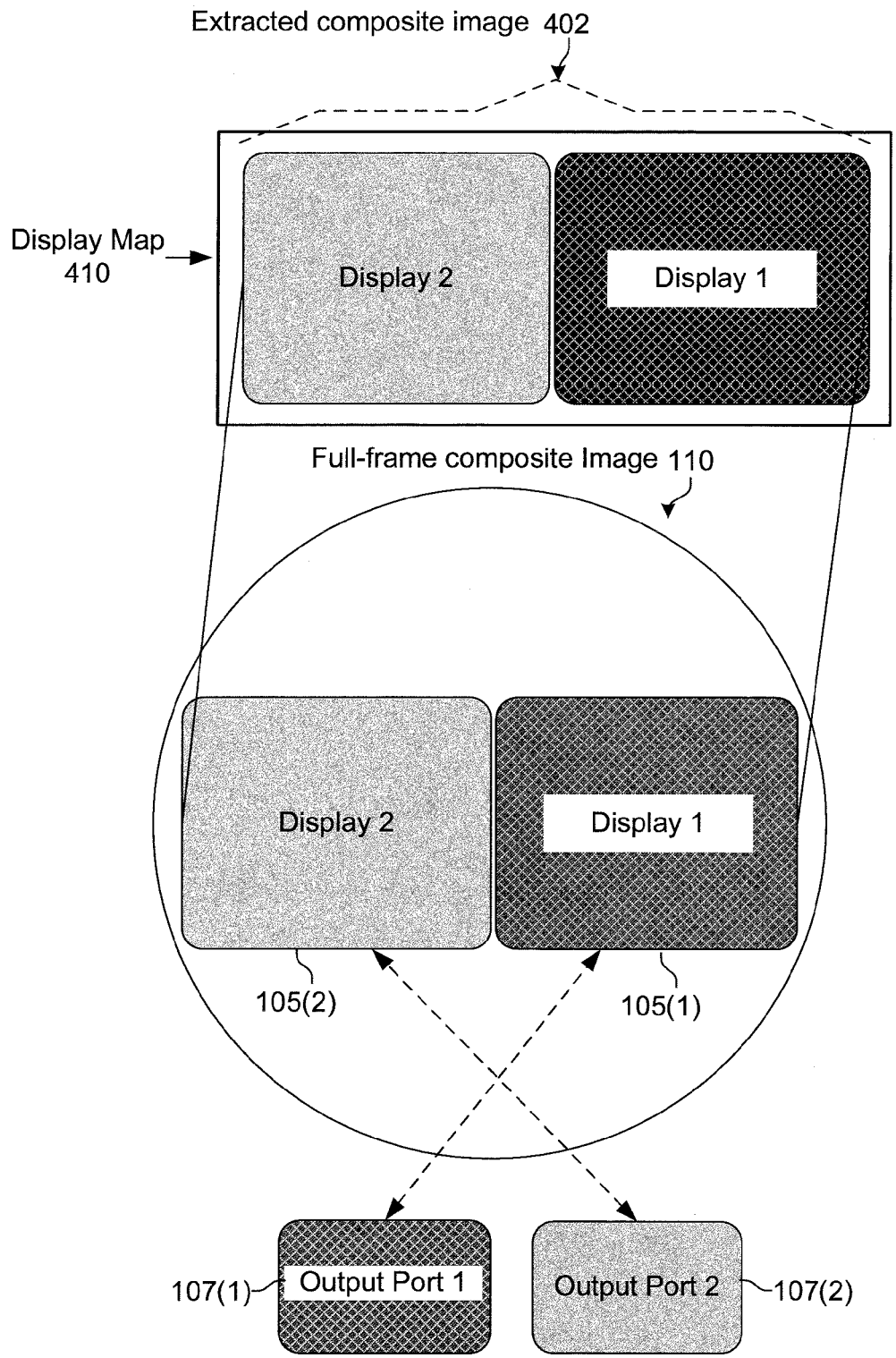
FIG. 4 is an exemplary diagram illustrating display mapping performed by the present system.

FIG. 4 is an exemplary diagram illustrating display mapping performed by the present system. As shown in FIG. 4, one of the 'full-frame' composite images 110 is used to generate an extracted composite image 402 showing the relative positions of each of the physical displays. Display map 410 is generated from extracted composite image 402 (or alternatively, the full-frame composite image 110, which includes the necessary information). Display map 410 encodes, per pixel, the display 105 which corresponds to specific portions of the virtual image (i.e., the entire image to be displayed).

Figure 5:
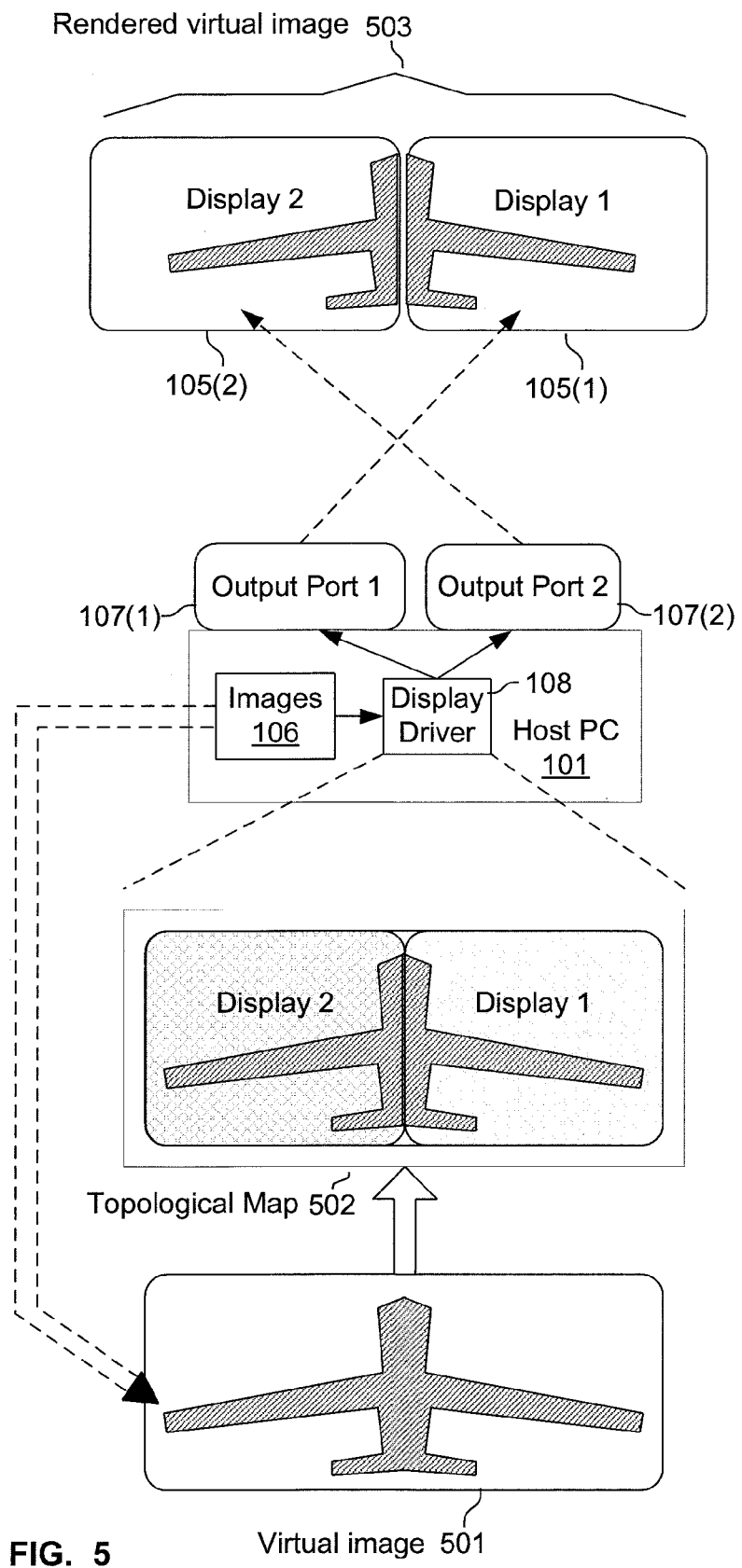
FIG. 5 is an exemplary diagram illustrating mapping between portions of the input image and the appropriate display.

FIG. 5 is an exemplary diagram illustrating mapping between virtual image 501 and the appropriate display 105. In an exemplary embodiment, display map 410 is processed to determine the topological relationship of the display devices 105. This topological relationship is then used to generate a topological map 502 which is used to map appropriate parts of the virtual image 501 to the corresponding display 105.

There are a number of different methods that may be used to convert the information in the display map into a topological map 502. In an exemplary embodiment, the center of mass of the pixels that correspond to a display is computed. The relationship of the center of mass of each display is then analyzed and used to encode the topological relationship indicated in the topological map. Additional information, such as the orientation of the camera, can be used to convert the observed relationships to true topological relationships. For example, if the camera is "upside down" with respect to the displays, the relationships "left of" and "right of" are reversed in the configuration.

Topological map 502 may be used to derive a set of positional commands that are issued (via an appropriate API) to either the display driver 108 or the host PC operating system. The commands relate the mapping of the proper parts of virtual image 501 to the determined position of each display 105. In the example shown in FIG. 5, the positional commands relate the fact that display 1 is to the 'right-of' display 2 when viewed by camera 104. Once the display driver (or host PC operating system) has been programmed in this way, the rendered virtual image 503 will appear topologically correct on the multiple displays (i.e., the left side of the virtual image appears on the left monitor). In the present case, each camera pixel corresponds to at most one display. However, in the case where the displays overlap, it is possible that more than one display maps to a single camera pixel.

As shown in FIG. 5, topological map 502 is used to map virtual image 501 to displays 105(1) and 105(2) via commands stored in display driver 108. Display driver 108 sends the appropriate parts of virtual image 501 to the correct displays 105(1)/105(2) via corresponding output ports 107(1)/107(2) as determined by the topological map 502.

The above description of certain embodiments of the invention is not intended to be exhaustive or to limit the invention to the precise forms disclosed. The terms used in the claims should not be construed to limit the invention to the specific embodiments disclosed in the specification, rather, the scope of the invention is to be determined by the following claims.

What is claimed is:

1. A method for automatic configuration of a plurality of display devices driven via respective ports of a display adaptor to produce a display of a virtual image, the method comprising:
    (a) displaying a pattern on one of the display devices;
    (b) capturing an image of all of the display devices including the displayed pattern;
    performing steps (a) and (b) in serial order on the remainder of the plurality of display devices to determine relative positions of the display devices and the correspondence between each said port and a specific one of the display devices;
    creating a display map that includes each said image thus captured, wherein the display map encodes, per pixel, the part of the display which corresponds to specific portions of the virtual image to be displayed;
    using information in the display map to derive display configuration information; and
    using the display configuration information to map portions of the virtual image to the corresponding displays.

2. The method of claim 1, further including:
    establishing relative positions of the display devices from the display map to create topological map indicating the relative positions of the display devices; and
    using the topological map to derive the display configuration information.

3. The method of claim 1, wherein the pattern is a solid color.

4. The method of claim 1, wherein different patterns are sent simultaneously to each of the display devices, and an image of each of the patterns is captured at a single point in time.

\* \* \* \* \*